(12) United States Patent
Berggren et al.

(10) Patent No.: US 7,301,687 B2
(45) Date of Patent: Nov. 27, 2007

(54) ELECTROCHEMICAL DEVICE (75) Inventors: Magnus Berggren, Vreta Kloster (SE); Thomas Kugler, Cambridge (GB); Tommi Remonen, Nyköping (SE); Jessica Häll, Norrköping (SE); Anna Malmström, Norrköping (SE)

(73) Assignee: Acreo AB, Kista (SE)

( * ) Notice: Subject to any disclaimer, the term of this patent is extended or adjusted under 35 U.S.C. 154(b) by 0 days.

(21) Appl. No.: 11/633,548

(22) Filed: Dec. 5, 2006

(65) Prior Publication Data

US 2007/0076287 A1    Apr. 5, 2007

Related U.S. Application Data

(62) Division of application No. 10/505,573, filed as application No. PCT/SE03/00393 on Mar. 7, 2003, now Pat. No. 7,158,277.

(30) Foreign Application Priority Data

Mar. 7, 2002    (SE) .................... PCT/SE02/00404

(51) Int. Cl.
*G02F 1/15*    (2006.01)
*G02F 1/153*    (2006.01)
*H01M 4/60*    (2006.01)

(52) U.S. Cl. .................... 359/274; 359/267; 359/265; 429/213

(58) Field of Classification Search ........ 359/265–275; 429/213, 217; 136/243; 307/400; 252/62.2, 252/62.3, 582
See application file for complete search history.

(56) References Cited

U.S. PATENT DOCUMENTS 4,764,415 A    8/1988  Isoda et al.
4,993,810 A    2/1991  Demiryont
5,049,868 A    9/1991  Green et al.
5,138,481 A    8/1992  Demiryont (Continued)

FOREIGN PATENT DOCUMENTS

EP    1 041 653    10/2000

(Continued)

OTHER PUBLICATIONS

"*Application of Dopant-Induced Structure-Property Changes of Conducting Polymers*" by R.H. Baughman and L.W. Schacklette from Science and Applications of Conducting Polymers, Proceedings of the Sixth Europhysics Industrial Workshop held in Lofthus Norway, May 1990, pp. 47 to 61.

(Continued)

*Primary Examiner*—Ricky Mack
*Assistant Examiner*—Jack Dinh
(74) *Attorney, Agent, or Firm*—Buchanan Ingersoll & Rooney PC (57) ABSTRACT

An electrochemically active element is provided which comprises a first layer of PEDOT-PSS mixed with an adhesion promoter, and a second layer of PANI which is in direct electrical contact with said first layer. Such an element exhibits a substantially increased resistance from being overoxidized, as well as an electrical conductivity which is virtually the same as for pure PEDOT-PSS, and substantially better than for pure PANI. The electrochemically active element can be used in e.g. electrochemical pixel devices, transistors, diodes etc.

15 Claims, 5 Drawing Sheets

U.S. PATENT DOCUMENTS

| | | |
|---|---|---|
| 5,204,937 A | 4/1993 | Minnaja |
| 5,300,575 A | 4/1994 | Jonas et al. |
| 5,347,144 A | 9/1994 | Garnier et al. |
| 5,444,330 A | 8/1995 | Leventis et al. |
| 5,446,577 A | 8/1995 | Bennett et al. |
| 5,742,424 A | 4/1998 | Coleman |
| 5,754,329 A | 5/1998 | Coleman |
| 5,812,300 A | 9/1998 | Coleman |
| 5,877,888 A | 3/1999 | Coleman |
| 5,912,759 A | 6/1999 | Good et al. |
| 6,118,572 A | 9/2000 | Kostecki et al. |
| 6,175,441 B1 | 1/2001 | Heuer et al. |
| 6,194,072 B1 | 2/2001 | Hambitzer et al. |
| 6,277,523 B1 | 8/2001 | Giron |
| 6,369,934 B1 | 4/2002 | Bechinger et al. |
| 6,444,400 B1 | 9/2002 | Cloots et al. |
| 6,587,250 B2 | 7/2003 | Armgarth et al. |
| 6,642,069 B2 | 11/2003 | Armgarth et al. |
| 7,158,277 B2 * | 1/2007 | Berggren et al. ........... 359/274 |
| 2002/0053320 A1 | 5/2002 | Duthaler et al. |
| 2003/0010959 A1 | 1/2003 | Lee et al. |

FOREIGN PATENT DOCUMENTS

| | | |
|---|---|---|
| WO | WO 94/15246 | 7/1994 |
| WO | WO 99/10939 | 3/1999 |

OTHER PUBLICATIONS

M. Solid State Electrochem, vol. 2, No. 2, 1998, V. Rani, K.S.V. Santhanam, "*Polycarbazole-Based Electrochemical Transistor*", p. 99 to p. 101, Abstract.

Kvarnström et al., In situ spectroelectrochemical characterization of poly(3,4-ethylenedioxythiophene), 1999, Electrochimica Acta 44 (1999) pp. 2739-2750.

* cited by examiner

ELECTROCHEMICAL DEVICE

This is a Divisional Application of U.S. patent application Ser. No. 10/505,573, filed Nov. 23, 2004, now U.S. Pat. No. 7,158,277 which is a 35 U.S.C. §371 filing Of International Patent Application No. PCT/SE03/00393, filed Mar. 7, 2003, and priority is claimed from the filing of U.S. patent application Ser. No. 10/091,397, filed Mar. 7, 2002 (now U.S. Pat. No. 6,642,069, granted Nov. 4, 2003), and International Application No. PCT/SE02/00404, filed Mar. 7, 2002.

FIELD OF THE INVENTION

The present invention is related to electrochemical devices, and in particular to printable, electrochemically active elements and electrochemical pixel devices based on conducting organic materials and electrochromic materials. The invention also relates to a process for the production of an electrochemical pixel device.

BACKGROUND OF THE INVENTION

Semiconducting and conducting organic materials, both polymers and molecules, have successfully been included in a large range of electronic devices, e g electrochemical devices, for instance as dynamic colorants in smart windows and in polymer batteries. Reversible doping and de-doping involving mobile ions switches the material between different redox states.

Electrochromic materials exhibit colour changes or changes in optical density as a result of electrochemical reduction and/or oxidation reactions. An electrochromic material can either be present as a solid, or exist as molecular, neutral or ionic species in an electrolyte solution. These materials have been used for the creation of electrochromic cells, where the passage of electric charge causes colour changes in the materials. Electrochromic cells are used in electrochromic devices of different kinds, and two principal categories of these devices can be distinguished. The two categories differ from each other mainly in the arrangement of the elements of the electrochromic cell.

The first category of electrochromic devices utilises a sandwich construction, and is used in applications such as automobile windows, building windows, sunglasses, large billboards, mirrors with variable reflectance, sunroofs etc. In this type of electrochromic device, continuous layers of electrochromic material and electrolyte (as well as other layers of e g ion reservoir material) are confined between two electrodes that completely cover the layers of electrochromic material and electrolyte. For the electrochromic device to be of use, at least one of said electrodes has to be transparent to let light through the device. This requirement is met in the prior art through the use of electrode materials such as indium-doped tin oxide (ITO), tin dioxide or fluorine-doped tin dioxide. The electrochromic materials used in these applications vary, but are often based on heavy metal oxides such as $WO_3$ or conducting polymers such as polyaniline or polypyrrole. The conducting, electrochromic polymer poly-(3,4-ethylendioxythiophene)(PEDOT) has attracted much study, and sandwich devices incorporating this polymer have been realised.

The second category of electrochromic devices aim at providing an electrically updateable display for realisation on a flexible support. U.S. Pat. No. 5,754,329 describes such a display, in which the electrodes of the electrochromic device are placed in one and the same plane, contacting a layer of electrochromic material for the generation of local colour effects at the interface between the electrochromic material and the electrodes. U.S. Pat. No. 5,877,888 represents a further development of this device, describing a two-sided display. However, the arrangement of the component layers of the electrochromic device is similar to that of the device of the U.S. Pat. No. 5,754,329 patent, considering that the electrodes on either side of the display support contact electrochromic material only, and the generation of electrochromic effects is confined to the area of the electrodes. The electrochromic materials that are used in these devices are described in detail in U.S. Pat. No. 5,812,300.

Problems with the pixel matrices in the displays of the prior art mentioned above include the fact that they are difficult and expensive to manufacture. In particular, no electrochemical pixel devices have been disclosed which are truly capable of being mass produced. Furthermore, the practical use of the pixel elements in the prior art devices has been hampered by their comparatively high power consumption as well as their short lifetimes. Also, materials used in prior art devices suffer from a lack of environmental friendliness, processability and economic production possibilities. There is therefore a need for new and improved pixel devices for incorporation in matrices that may be used in displays.

Actually, the lifetime problem is found to be widespread and similar problems are experienced in other types of electrochemical devices, such as electrochemical diodes and transistors. One critical factor for the lifetime of such devices is the performance of their electrochemically active elements, i.e. the element which is supposed to provide for redox reactions. There is therefore a general need for improved electrochemically active elements, not only for pixel devices but also for any other type of electrochemical device.

SUMMARY OF THE INVENTION

The inventors have found that the application of PANI onto PEDOT-PSS provides a number of advantages. For example, since PANI is not as easily overoxidised as is PEDOT-PSS, the PANI layer provides a protective buffer. When oxidising a protected piece of PEDOT-PSS, the redox reaction will be localised to the layer of PANI without it being overoxidised. If the redox reaction is limited in time, the redox reaction might not even affect the PEDOT-PSS at all. Moreover, when the layer of PANI is oxidised, its electrical conductivity will be reduced. Since the speed of the oxidation process is a function of the applied voltage, the oxidation will be asymmetrically distributed in cases where the current density distribution is asymmetrical. In areas where the current density is the highest, the layer of PANI will be most strongly oxidised and thus its conductivity reduced and, in effect, the current density redistributed so as to provide additional protection for particularly exposed portions of the PEDOT-PSS. This method can advantageously be used in the manufacture of various polymer based electrochemical devices, such as transistors, diodes, and pixel elements.

However, applying PANI directly onto PEDOT-PSS might involve some problems. This is the case for example when trying to spin coat an Orgacon™ EL-350 foil with PANI, and noticed for the prefabricated PEDOT-PSS laminates like Orgacon™ El-350. The problem of adhering PANI on to PEDOT-PSS is not limited to the mere application process. The resulting PEDOT-PSS/PANI laminate might also delaminate at a later stage, when the element is in use. For example, when switching the element between different redox states, PANI and PEDOT-PSS layers might exhibit different swelling or expansion properties, thus causing stress in the joint between the two materials.

The inventors have realised that these problems can be eliminated or at least alleviated in a novel and unexpected way. The inventors have found that an electrochemical element comprising a first layer of PEDOT/PANI mixed with an adhesive, which layer is in direct electrical contact with a second layer comprising PANI, exhibits a substantially increased resistance from being overoxidised, as compared to an element comprising pure PEDOT-PSS. Moreover, the electrical conductivity is normally virtually the same as for pure PEDOT-PSS, and substantially better than for pure PANI.

Thus, according to a first aspect of the invention, an electrochemically active element is provide comprising:

a first layer comprising PEDOT-PSS mixed with an adhesion promoter; and a second layer comprising PANI which is in direct electrical contact with the first layer.

This novel electrochemical element may provide for excellent electrical conductivity and excellent switching properties, i.e. the difference in electrical conductivity between its redox states is substantial. It furthermore provides for enhanced protection against overoxidation, as compared to pure PEDOT-PSS. On the other hand, as compared to pure PANI the inventive element provides substantially improved electrical conductivity. In essence, the inventive element combines the individual advantages of PEDOT-PSS and PANI into one single element.

According to one embodiment, said adhesion promoter is selected from a group comprising: polystyrene, latex formulations, PMMA (poly(methylemetaacrylate)), polyurethanes, polyglycol esters, N-vinyl lactams, gelatine, a gelatine derivative, polyacrylic acids or esters, polymethacrylic acid, poly(vinylpyrrolidone), polysaccharides, cellulose derivatives, hydroxyethylcellulose, polyacrylamides, polyurethanes, polypropylene oxides, polyethylene oxides, poly(styrene sulphonic acid), poly(styrene sulphonic esters), poly(vinyl alcohol esters) and poly(vinyl alcohol) and derivatives, salts, blends and copolymers thereof.

According to one embodiment, said adhesion promoter comprises polystyrene.

According to a further embodiment, the layer of PANI is cast from a toluene solution. Such PANI provides for enhanced adhesiveness to the mixture comprising PEDOT-PSS/polystyrene.

According to another embodiment, the electrochemically active element forms part of a pixel device or a transistor device or a diode device.

Furthermore, the PEDOT-PSS polymer (poly-(3,4-ethylendioxythiophene) doped with poly(styrene sulfonate)) combines electrical and electrochromic properties; when reduced PEDOT-PSS is blue in colour it has low electrical conductivity, and when oxidised PEDOT-PSS turns transparent, its electrical conductivity is substantially increased. However, even when reduced, the electrical conductivity of PEDOT-PSS is generally enough to facilitate the electron transport needed for the polymer to function as an electrode and thus to promote additional electrochemical reactions. This enables the PEDOT-PSS to function as an electrode even in its low conducting state. Due to the combination of electrical conductivity and electrochromic properties, PEDOT-PSS can be used both as electrodes and as electrochemical elements in the electrochromical devices. Thereby the manufacturing of the device is substantially simplified, since only two active materials need to be used; PEDOT-PSS and a suitably chosen electrolyte. For example, it is possible to use a prefabricated PEDOT-PSS laminate, which comprises a flexible substrate on which a continuous layer of PEDOT-PSS is deposited. Such prefabricated laminates are currently commercially available from Agfa under the trade names Orgacon™ EL-350 and Orgacon™ EL-1500. The difference between these laminates is their electrical conductivity, Orgacon™ EL-350 having a higher conductivity (lower surface resistance) than Orgacon™ EL-1500. For most pixel applications, Orgacon™ EL-350 is the preferred choice. As it appears, the Orgacon™ EL-1500 has too moderate a contrast ratio to be used in most displays applications.

However, a disadvantage using PEDOT-PSS as the electrochromic element is that driving voltages in the range of 1.0-2.0 V are required for the electrochromic reactions to occur. Such high voltages, especially in combination with an electrolyte that has a low ionic conductivity, results not only in the intended reduction of the cathode electrode, which provides a deep-blue colour, but also in a high degree of oxidation of the anode electrode. This high degree of oxidation results in a so-called "overoxidation" of the PEDOT-PSS anode, which is assumed to correspond to an irreversible interruption of the conjugated pi-system on the polythiophene backbone of the PEDOT-PSS polymer. As a consequence, PEDOT-PSS permanently loses its electrical conductivity as well as its electrochromic behaviour and thus cannot be switched back to its reduced state.

Furthermore, in case higher switching speeds are needed, driving voltages as high as 10 volts may be required, depending on the lateral size of the pixel. Of course, using such high driving voltages for PEDOT-PSS elements dramatically increases the problems related to overoxidation and short lifetimes.

The use of PEDOT-PSS for the electrochromic element thus involves a lifetime problem in that it easily can be overoxidized, resulting in a permanent and substantial decrease in electrical conductivity. Overoxidation is partially a function of electric field density and occurs if the polymer is exposed to a too high oxidative current. Therefore, due to their asymmetrical design overoxidation is particularly problematic in lateral structures. In lateral structures, as opposed to vertical structures, the current has to flow laterally in the electrolyte and such architectures are thus much more sensitive to differences in electrical conductivity between the electrolyte and the electrode or electrochromic element. In case the electrolyte has a higher electrical conductivity than the electrochromic element, the current will tend to flow in the electrolyte instead of the electrochromic element or the counter electrode and the electric field at the electrolyte interfaces will thus be the strongest at the outer ends of the electrolyte layer. In case the electrolyte has a lower electrical conductivity than the electrochromic element (which often is the case for solidified electrolytes), the electric field will instead be the strongest at the opposite end of the electrochromic element, i.e. in the area closest to the counter electrode One way of compensating for the effect of overoxidation (i.e. the reduced electrical conductivity) is to increase the driving voltage. However, increased driving voltages obviously increase the degradation of the electrochromic material and thus accelerate the overoxidation process even more.

Furthermore, for some applications lateral PEDOT-PSS pixels might exhibit poor contrast between their different colour states, and the updating time for such pixels might be too slow. The updating time can be improved by increasing the driving voltage, for example to 5-10 V. However, such high driving voltages will rapidly render the PEDOT-PSS polymer overoxidised.

To this end, the inventors have realised that the electrochromic element advantageously can be made out polyaniline, commonly called PANI. Thus, according to one embodiment, the electrochromic element comprises polyaniline.

The voltage needed in order to perform redox reactions in PANI is substantially lower than that needed for PEDOT-PSS. Typically 1-2 V is needed in order to oxidise or reduce PEDOT-PSS elements, whereas a voltage as low as 0.5 V might be sufficient for PANI elements. Furthermore, PANI deposited on top of PEDOT-PSS does not become overoxidised as easily as PEDOT-PSS itself and the PEDOT-PSS layer underneath the PANI layer is substantially protected from overoxidation as compared to uncoated PEDOT-PSS. Therefore, the above discussed lifetime problem is substantially reduced when using electrochemical elements based on PANI. The combination of lower driving voltages and higher threshold for overoxidation substantially reduces the lifetime problems related to overoxidation. In fact, using PANI in the electrochromic element it is even possible to increase the driving voltage to 10 V, thus facilitating substantially faster switching of the pixel, without the electrochromic element being overoxidised. However, as stated above PEDOT-PSS is almost transparent (actually it is slightly yellowish) when oxidised and turns blue when reduced. This is opposed to PANI, which is blue when oxidised and virtually transparent when reduced. Therefore, using PANI instead of PEDOT-PSS in the electrochromic element will invert the colour of the pixel. When oxidised it will turn blue and when reduced it will turn transparent. Of course, this opposite colouring effect does not generally cause a problem but affects the design of the pixel and the way in which it is driven.

The electrochromic element can be placed in any structural relation to its corresponding electrode. For example, it can be applied as a layer onto the electrode, or it can be placed laterally in relation to the electrode. However, placing the PANI element laterally in relation to the electrode is problematic for some applications, due to the low conductivity of PANI. If an electrochromic element based on PANI is placed as a layer on top of the electrode, due care is needed when reducing the electrochromic element so as to avid reducing also the PEDOT-PSS electrode. Otherwise the blue colour of reduced PEDOT-PSS will be visible trough the reduced and thus transparent PANI and the pixel will in fact switch from blue to blue, a property which obviously is unwanted for most applications.

A pixel according to one embodiment can thus be manufactured as follows: A first and a second PEDOT-PSS electrode are printed on a substrate using any conventional printing method. Alternatively, a layer of Baytron P™, commercially available from Bayer AG, can be drop cast on to the substrate. Thereafter, a layer of PANI is printed on top of the first electrode, thus forming the electrochromically active element. Alternatively, the layer of PANI is printed next to and in contact with the first electrode. Finally, a layer of electrolyte is applied over at least parts of the electrochromic element and the second electrode. Actually, only the parts covered by electrolyte will function as electrochemically active elements. As it turns out, adhesion is substantially improved when using PEDOT-PSS in the form of screen printing pastes, e.g. Orgacon™ EL as provided by Agfa. Such screen printing inks have been "diluted" with different binders/"bulk fillers", such as polystyrene, which in effect function as adhesion promoters when PANI is subsequently applied. Furthermore, such screen printing pastes exhibit a substantially moderated electrochromic effect. Thus, according to one embodiment the electrodes are formed out of a mixture comprising PEDOT-PSS and an adhesion promoter. It has been found that a mixture such as Orgacon™ EL, which mainly consists of PEDOT-PSS and polystyrene, organises itself in a web-like configuration when printed on a substrate. An interconnected web of PEDOT-PSS is formed, which embraces a large number of small polystyrene "islands" or dots. As it appears, the web of PEDOT-PSS provides for electrical conductivity, while the polystyrene dots, which typically occupy a larger fraction of the surface, counteract the hydrophilic properties of the mixture. Thus, a mixture of PEDOT-PSS and polystyrene is found to provide a material which has sufficient electrical conductivity, which is not hydrophilic in relation to PANI, and which thus is an excellent material to use for the electrodes. Furthermore, the apparent electrochromic effect is reduced as compared to pure PEDOT-PSS and consequently the mixture does not interfere with optical effects displayed by the PANI-based electrochromic element.

In general, PEDOT-PSS exhibits hydrophilic properties when in contact with PANI diluted in organic solvent. Therefore, applying PANI directly onto PEDOT-PSS might involve some problems. This is the case for example when trying to spin coat Orgacon™ EL-350 fiol with PANI. The hydrophilic character of the PEDOT-PSS surface is due to the enrichment of PSS on the surface, since PSS is very hydrophilic. The problem of adhering PANI on to PEDOT-PSS is not limited to the mere application process. The resulting PEDOT-PSS/PANI laminate might also delaminate at a later stage, when the element is in use. For example, when switching the element between different redox states, PANI and PEDOT-PSS layers might exhibit different swelling or expansions properties, thus causing stress in the joint between the two materials.

Using PEDOT-PSS/polystyrene electrodes, PANI electrochromic elements are easily printed or casted directly on a portion of one of the electrodes, thus providing for even better contact between the electrode and the element.

An electrochromic pixel can thus be manufactured as follows. First, the electrodes are printed on a substrate using a mixture of PEDOT-PSS and an adhesion promoter (for example Orgacon™ EL) by means of any conventional printing technique. Second, at least one of the electrodes is covered by a layer of PANI. Finally, the electrochromic element is covered by a layer of transparent electrolyte.

The inventors have further more realised that the adhesion of PANI onto a PEDOT-PSS/polystyrene mixture can be further improved by using PANI that is cast from a toluene solution (such as PANIPOL™ T™, commercially available from PANIPOL). Thus, according to one embodiment of the invention, the polyaniline in the electrochromic element is cast from a toluene solution.

As a basis for the invention, several circumstances are realized and utilized in a synergistic manner, namely:

The voltage needed in order to provide electrochromical effects in PANI is substantially lower than the voltage needed in order to provide electrochromical effects in PEDOT-PSS.

Through mixing of PEDOT-PSS with an adhesion promoter such as polystyrene, the hydrophilic effect exhibited by pure PEDOT-PSS in relation to PANI can be eliminated. Thus, a mixture of PEDOT-PSS and polystyrene is easily coated with a layer of PANI.

A mixture of PEDOT-PSS and a suitably chosen adhesion promoter, such as polystyrene, exhibits reduced electrochromic properties as compared to pure PEDOT-PSS. Thus, a printed such mixture does not change colour or conductivity to the same extent as does PEDOT-PSS PSS such as Orgacon™ EL-350 or films cast from Baytron P™.

The adhesion of PANI onto a mixture of PEDOT-PSS and an adhesion promoter, such as Orgacon™ EL, is substantially enhanced when using PANI that is cast from a toluene solution.

A higher voltage, facilitating faster switching, is tolerated by the combination of PANI and PEDOT-PSS elements as compared to PEDOT-PSS element only.

An electrolyte having lower electrical conductivity may be used when the electrochemic/electrochromic element is based on PANI as compared to the PEDOT-PSS case, since the electrolyte controls a large portion of the electric field distribution in the device.

The contrast ratio is substantially improved using electrochromic elements based on PANI instead of PEDOT-PSS.

It is thus recognized that these circumstances can be exploited in an synergistic manner in order to provide improved electrochromic and electrochemical elements.

In exemplifying embodiments, an electrochromic device is provided, which comprises at least one further electrochromic material to complement said electrochromic material in the electrochromic element. This makes it possible to realise devices with more than one colour, with for example one colour-generating oxidation reaction and one colour-generating reduction reaction taking place simultaneously at different locations in the device. For example, an electrochromic device having two electrochromic elements, one based on PEDOT-PSS and one based on PEDOT-PSS/PANI, provides similar colouring effects in both elements. When the PEDOT-PSS/PANI element is reduced, the PEDOT-PSS element is oxidised and both consequently turn transparent. On the other hand, when the PEDOT-PSS/PANI element is oxidised, the PEDOT-PSS element is reduced and both turn blue. Using this combination, it is possible to maximise the pixel area of the device, since both electrodes can form part of the visible area of the display. As a further example, redox reactions giving rise to different colours at the same location, but at different applied voltages, can be designed. This further electrochromic material can be provided within the solidified electrolyte or within the electrochromic element, which then for example comprises an electrochromic redox pair.

Embodiments of the electrochromic device may also comprise a redox active material which does not in itself give rise to electrochromic effects. Such a material may fulfill any or both of the following two roles: (i) In some arrangements of the electrochromic device, the electrochromic material of the entire volume of the electrochromic element can not be completely oxidised or reduced in the absence of a complementary redox reaction; rather, only part of the material will be oxidised or reduced, respectively. Thus, the addition of a further redox active material makes it possible to fully oxidise or reduce the electrochromic material. (ii) The electrochromic material may be sensitive to overoxidation, occurring at too high an applied voltage, and destroying the electrochromic material rendering it useless. A further redox active material comprised in the device may serve the function of protecting the electrochromic material from such overoxidation, through restricting the electric polarisation in the electrochromic element to a value below a threshold value. At this threshold value, the protective, further redox active material will instead be oxidised, protecting the electrochromic material from a polarisation that would otherwise destroy it. As is readily appreciated by the skilled man in the light of what is discussed above, a suitably chosen redox active material, exhibiting electrochromic effects, could serve the function of providing a complementary, colour-generating reaction, at the same time as it provides either or both of the beneficial effects of protection against overoxidation and enabling of complete reduction/oxidation of the first electrochromic material. In effect, this is the case for the above discussed device having one electrochromic element based on PEDOT-PSS and one based on PEDOT-PSS/PANI.

In some embodiments of the electrochromic device, dynamic or variable colouring effects in the electrochromic device may be generated through use of a combination of different solidified electrolytes, having different ionic conductivities. Parts of an electrochromic element, or some of a plurality of electrochromic elements, may then be in direct electrical contact with such different electrolytes. Electrochromic areas that are in contact with an electrolyte having higher ionic conductivity will colour/decolour faster than electrochromic areas that are in contact with an electrolyte having a lesser ionic conductivity, which makes possible different combinations of image elements with different colouring and decolouring speeds.

For the successful operation of the electrochromic device, it comprises a solidified electrolyte. The electrolyte enables the electrochemical reactions resulting in a colour change in the electrochromic element. The solidified electrolyte is as defined in the "Materials" section below. The electrochromic device according to the invention is advantageous in that it can be easily realised on a support, such as polymer film or paper. Thus, the different components can be deposited on the support by means of conventional printing techniques such as screen printing, offset printing, ink-jet printing and flexographic printing, or coating techniques such as knife coating, doctor blade coating, extrusion coating and curtain coating, such as described in "Modern Coating and Drying Technology" (1992), eds E D Cohen and E B Gutoff, VCH Publishers Inc, New York, N.Y., USA. The polymers utilised in the invention can also be deposited through in situ polymerisation by methods such as electropolymerisation, UV-polymerisation, thermal polymerisation and chemical polymerisation. As an alternative to these additive techniques for patterning of the components, it is also possible to use subtractive techniques, such as local destruction of material through chemical or gas etching, by mechanical means such as scratching, scoring, scraping or milling, or by any other subtractive methods known in the art. Alternatively, overoxidative patterning of PEDOT-PSS as described in the co-pending patent application PCT/SE02/01663 can be exploited.

According to one exemplifying embodiment, the electrochromic device is encapsulated, in part or entirely, for protection of the device. The encapsulation retains any solvent needed for e g the solidified electrolyte to function, and also keeps oxygen from disturbing the electrochemical reactions in the device. Encapsulation can be achieved through liquid phase processes. Thus, a liquid phase polymer or organic monomer can be deposited on the device using methods such as spray-coating, dip-coating or any of the conventional printing techniques listed above. After deposition, the encapsulant can be hardened for example by ultraviolet or infrared irradiation, by solvent evaporation, by cooling or through the use of a two-component system, such as an epoxy glue, where the components are mixed together directly prior to deposition. Alternatively, the encapsulation is achieved through lamination of a solid film onto the electrochemical pixel device. In embodiments of the invention, in which the components of the electrochemical pixel device are arranged on a support, this support can function as the bottom encapsulant. In this case encapsulation is made more convenient in that only the top of the sheet needs to be covered with liquid phase encapsulant or laminated with solid film.

The inventors have furthermore realised that a mixture of PEDOT-PSS and polystyrene coated with a layer of PANI provides an excellent active elecrochemical element also for other applications than as electrochromic elements. For example, such an element can be used as electrodes in electrochemical transistors, diodes or pixels. In such applications, the PANI layer serves to protect the PEDOT-PSS electrode from overoxidation. The fact that the element happens to change colour is for these applications only to be seen as a side effect. As compared to pure PEDOT-PSS, this novel element exhibits a substantially increased resistance from being overoxidised. The electrical conductivity is virtually the same as for pure PEDOT-PSS, and thus substantially better than for pure PANI.

The application of PANI onto PEDOT-PSS provides a number of additional advantages. First, since PANI is not as easily overoxidised as is PEDOT-PSS, the PANI layer provides a protective buffer. When oxidising a protected piece of PEDOT-PSS, the redox reaction will be localised to the layer of PANI without it being overoxidised. If the redox reaction is limited in time, the redox reaction might not even affect the PEDOT-PSS at all. Second, when the layer of PANI is oxidised, its electrical conductivity will be reduced. Since the speed of the oxidation process is a function of the applied voltage, the oxidation will be asymmetrically distributed in cases where the current density distribution is asymmetrical. In areas where the current density is the highest, the layer of PANI will be most strongly oxidised and thus its conductivity reduced and, in effect, the current density redistributed so as to provide additional protection for particularly exposed portions of the PEDOT-PSS. This method can advantageously be used in the manufacture of various polymer based electrochemical devices, such as transistors, diodes, and pixel elements.

In essence, the inventive element combines the individual advantages of PEDOT-PSS and PANI into one single element.

According to one exemplifying embodiment an electrochromic device is provided comprising: at least one electrochromic element comprising (i) at least one material that is electrically conducting in at least one oxidation state and (ii) at least one electrochromic material, wherein said materials (i) and (ii) can be the same or different;

at least one layer of a solidified electrolyte which is in direct electrical contact with said electrochromic element; and at least two electrodes comprising PEDOT-PSS, arranged side by side in a common plane and adapted for application of a voltage therebetween, one of said electrodes being in direct electrical contact with a component selected from said electrochromic element(s) and the other electrode(s) being in direct electrical contact with a component selected from said electrolyte layer(s) and said electrochromic element(s).

The electrochromic element may be formed from the same material as the electrodes, or from a different material. The electrodes are arranged side by side in a plane and thus form an electrode layer, which can be deposited on a support in a conventional manner and patterned in any desirable fashion. Compared to ordinary, stacked or sandwiched electrochromic elements, this lateral pixel configuration has many advantages. For example, the need for a transparent electrode is eliminated, since the electrochromic surface can be viewed directly through the electrolyte.

The electrode pattern, as well as the electrochromic element, can then be patterned in the PEDOT-PSS layer using any known principle, as is further described below. Having patterned the polymer, a layer of electrolyte can be deposited onto the polymer, for example using a printing technique.

Further objects and purposes of the present invention will be clear from the following drawings and detailed description of specific embodiments thereof. These specifications and drawings are intended as illustrations, and are not to be seen as limiting in any way.

DESCRIPTION OF PREFERRED EMBODIMENTS

Definitions:

Redox state: when reference is made to changes in the "redox state" of the electrochromic element, this is intended to include cases where the material in the element is either oxidised or reduced, as well as cases where there is a redistribution of charges within the element, so that one end is reduced and the other end is oxidised. In the latter case, the element as a whole retains its overall redox state, but its redox state has nevertheless been changed according to the definition used herein, due to the internal redistribution of charge carriers.

Electrochromic element: an "electrochromic element" in the devices of the invention is a continuous geometrical body, which can be patterned to different shapes, and is composed of one material or a combination of materials. The material(s) may be organic or inorganic, molecular or polymeric. Such an electrochromic element, whether it is composed of one material or is an ensemble of more than one material, combines the following properties: at least one material is electrically conducting in at least one oxidation state, and at least one material is electrochromic, i e, exhibits colour change as a result of electrochemical redox reactions within the material.

Electrochemically active element: an "electro-chemically active element" according to the present invention, is an element having parameters which can be switched or altered by means of redox reactions in the element. In order to facilitate said reactions, the active elements are generally in contact with an electrolyte. The elements can for example be covered by a solidified electrolyte, as defined below. Typically, the switchable parameters include electrical conductivity and/or optical appearance, i.e. colour or brightness. The above defined "electrochromic element" is one example of an electrochemically active element, wherein the optical appearance is the exploited parameter. As such, the electrochromic element may, of course, be utilised in any type of electrochromic pixels, e.g. lateral pixels in which the electrodes are arranged side by side in a common plane and vertical pixels in which the electrodes are sandwiched on top of each other. Another example of electrochemically active elements is found in electrochemical transistors or diodes, wherein the exploited parameter is the electrical conductivity and the electrochemically active element is used to provide a transistor channel. As is readily appreciated by the skilled man, electrochemically active elements are to be found in many different applications, and the common denominator is that they have properties which are switchable by means of redox reactions. Solidified electrolyte: for the purposes of the invention, "solidified electrolyte" means an electrolyte, which at the temperatures at which it is used is sufficiently rigid that particles/flakes in the bulk therein are substantially immobilised by the high viscosity/rigidity of the electrolyte and that it doesn't flow or leak. In the preferred case, such an electrolyte has the proper rheological properties to allow for the ready application of this material on a support in an integral sheet or in a pattern, for example by conventional printing methods. After deposition, the electrolyte formulation should solidify upon evaporation of solvent or because of a chemical cross-linking reaction, brought about by additional chemical reagents or by physical effect, such as irradiation by ultraviolet, infrared or microwave radiation, cooling or any other such. The solidified electrolyte preferably comprises an aqueous or organic solvent-containing gel, such as gelatine or a polymeric gel. However, solid polymeric electrolytes are also contemplated and fall within the scope of the present invention. Furthermore, the definition also encompasses liquid electrolyte solutions soaked into, or in any other way hosted by, an appropriate matrix material, such as a paper, a fabric or a porous polymer. In some embodiments of the invention, this material is in fact the support upon which the electrochemical pixel device is arranged, so that the support forms an integral part of the operation of the device.

Electrodes: "electrodes" in devices according to the invention are structures that are composed of an electrically conducting material. Such electrodes allow the application of an external voltage to electrolyte, whereby an electric field within the solidified electrolyte is sustained for a time period long enough for the desired electrochemical reactions to occur. In some applications, electrodes might form part of, or even constitute, electrochemically active elements and/or electrochromic elements.

Direct electrical contact: Direct physical contact (common interface) between two phases (for example electrode and electrolyte) that allows for the exchange of charges through the interface. Charge exchange through the interface can comprise transfer of electrons between electrically conducting phases, transfer of ions between ionically conducting phases, or conversion between electronic current and ionic current by means of electrochemistry at an interface between for example electrode and electrolyte, electrolyte and electrochromic element, or electrolyte and electrochemically active element, or by occurrence of capacitive currents due to the charging of the Helmholtz layer at such an interface. Colour change: when reference is made to "colour change", this is also meant to include changes in optical density or reflectance, so that "colour change" for example takes into account changes from blue to red, blue to colourless, dark green to light green, grey to white or dark grey to light grey alike.

Adhesion promoter: An adhesion promoter is a material capable of increasing the adhesion between the PEDO-PSS layer and an additional layer of another material. Without wishing to be bound by this theory, it is thought that this effect is achieved through:

1. Changing the surface energies. For example, rendering the hydrophilic PSS-rich PEDOT-PSS surface more hydrophobic; and/or 2. The creation of an interfacing layer between the PEDOT-PSS layer and the additional layer, which interface layer comprises a mixture of PEDOT-PSS and the other material. For example, a material (such as polystyrene) slightly soluble in the solvent(s) (e.g. toluene) used to deposit the additional layer (PANI).

Depending on the degree of hydrophobicity wanted/needed and depending on what materials to deposit on top of the PEDOT-PSS different amounts of these materials or mixtures of these materials can be added. Examples of materials to be used as adhesion promoters include polystyrene, different latex formulations, PMMA (poly(methylemetaacrylate)), polyurethanes, polyglycol esters, N-vinyl lactams, gelatine, a gelatine derivative, polyacrylic acids or esters, polymethacrylic acid, poly-(vinylpyrrolidone), polysaccharides, hydroxyethylcellulose and other cellulose derivatives, polyacrylamides, polyurethanes, polypropylene oxides, polyethylene oxides, poly(styrene sulphonic acid), poly-(styrene sulphonic esters), poly(vinyl alcohol esters) and poly(vinyl alcohol) and derivatives, salts, blends and copolymers thereof; and may optionally be cross-linked. The functioning of general adhesion promoters is described in literature, for example in "Adhesion and Adhesives Technology: An Introduction, 2nd Ed", by Alphonsus V. Pocius, ISBN: 1-569-90319-0.

Materials

Preferably, the solidified electrolyte in electrochromic device comprises a binder. It is preferred that this binder have gelling properties. The binder is preferably selected from the group consisting of gelatine, a gelatine derivative, polyacrylic acid, polymethacrylic acid, poly(vinylpyrrolidone), polysaccharides, polyacryl-amides, polyurethanes, polypropylene oxides, polyethylene oxides, poly(styrene sulphonic acid) and poly(vinyl alcohol) and salts and copolymers thereof; and may optionally be cross-linked. The solidified electrolyte preferably further comprises an ionic salt, preferably magnesium sulphate if the binder employed is gelatine. The solidified electrolyte preferably further contains a hygroscopic salt such as magnesium chloride to maintain the water content therein.

In preferred embodiments, the electrochromic element for use in the electrochromic device of the present invention comprises, as electrochromic material, an electrochromic polymer which is electrically conducting in at least one oxidation state, and optionally also comprises a polyanion compound. Electrochromic polymers for use in the electrochromic element of the invention are preferably selected from the group consisting of electrochromic polythiophenes, electrochromic polypyrroles, electrochromic polyanilines, electrochromic polyisothianaphthalenes, electrochromic polyphenylene vinylenes and copolymers thereof, such as described by J C Gustafsson et al in Solid State Ionics, 69, 145-152 (1994); Handbook of Oligo- and Polythiophenes, Ch 10.8, Ed D Fichou, Wiley-VCH, Weinhem (1999); by P Schottland et al in Macromolecules, 33, 7051-7061 (2000);

Technology Map Conductive Polymers, SRI Consulting (1999); by M Onoda in Journal of the Electrochemical Society, 141, 338-341 (1994); by M Chandrasekar in Conducting Polymers, Fundamentals and Applications, a Practical Approach, Kluwer Academic Publishers, Boston (1999); and by A J Epstein et al in Macromol Chem, Macromol Symp, 51, 217-234 (1991). In a preferred embodiment, the electrochromic polymer is a polymer or copolymer of a 3,4-dialkoxythiophene, in which said two alkoxy groups may be the same or different or together represent an optionally substituted oxy-alkylene-oxy bridge. In some embodiments, the electrochromic polymer is a polymer or copolymer of a 3,4-dialkoxythiophene selected from the group consisting of poly(3,4-methylenedioxythiophene), poly(3,4-methylene-dioxythiophene) derivatives, poly(3,4-ethylenedioxythiophene), poly(3,4-ethylenedioxythiophene) derivatives, poly(3,4-propylenedioxythiophene), poly(3,4-propylenedioxythiophene) derivatives, poly(3,4-butylenedioxythiophene), poly(3,4-butylenedioxythiophene) derivatives, and copolymers therewith. The polyanion compound is then preferably poly(styrene sulfonate). As is readily appreciated by the skilled man, in alternative embodiments of the invention, the electrochromic material comprises any non-polymer material, combination of different non-polymer materials, or combination of polymer materials with non-polymer materials, which exhibit conductivity in at least one oxidation state as well as electrochromic behaviour. Electrochromic elements comprising combinations of more than one polymer material, such as polymer blends, or several layers of electrochromic materials, wherein the different layers consist of the same material or different materials, e g one layer each of two different electrochromic polymers, are also contemplated.

For example, one could use a composite of an electrically conducting material and an electrochromic material, such as electrically conductive particles such as tin oxide, ITO or ATO particles with polymer or non-polymer electrochromic materials such as polyaniline, polypyrrole, polythiophene, nickel oxide, polyvinylferrocene, polyviologen, tungsten oxide, iridium oxide, molybdenum oxide and Prussian blue (ferric ferrocyanide). As non-limiting examples of electrochromic elements for use in the device of the invention, mention can be made of: a piece of PEDOT-PSS, being both conducting and electrochromic; a piece of PEDOT-PSS with $Fe^{2+}/SCN^-$, PEDOT-PSS being conducting and electrochromic and $Fe^{2+}/SCN^-$ being an additional electrochromic component (see below); a piece composed of a continuous network of conducting ITO particles in an insulating polymeric matrix, in direct electrical contact with an electrochromic $WO_3$-coating; a piece composed of a continuous network of conducting ITO particles in an insulating polymeric matrix, in contact with an electrochromic component dissolved in an electrolyte.

Some embodiments of the invention comprise a further electrochromic material for realisation of pixel devices with more than one colour. This further electrochromic material can be provided within the electrochromic element or the solidified electrolyte of the electrochromic device, which then for example comprises an electrochromic redox system, such as the redox pair of colourless $Fe^{2+}$ and $SCN^-$ ions on one hand, and of red $Fe^{3+}$ (SCN) $(H_2O)_5$ complex on the other. By way of further, non-limiting example, such materials may be selected from different phenazines such as DMPA—5,10-dihydro-5,10-dimethylphenazine, DEPA—5,10-dihydro-5,10-diethyl-phenazine and DOPA—5,10-dihydro-5,10-dioctylphenazine, from TMPD—N,N,N',N'-tetramethylphenylenediamine, TMBZ—N,N,N',N'-tetramethylbenzidine, TTF—tetrathiafulvalene, phenanthroline-iron complexes, erioglaucin A, diphenylamines, p-ethoxychrysoidine, methylene blue, different indigos and phenosafranines, as well as mixtures thereof.

As described above, the electrochromic device of the invention may comprise a redox active material for reasons other than additional colouring effects. This redox active material may be the same or different from any of the further electrochromic materials listed immediately above. Thus, any suitable anti-oxidant or anti-reductant may be used, for example organic substances like vitamin C, alcohols, polyalcohols (e g glycerol) or sugars, the alcohols, polyalcohols or sugars where appropriate being present at a high pH, conjugated polymers, oligomers and single molecules; inorganic substances like salts comprising species that may be oxidised (e g $Fe^{2+}$ to $Fe^{3+}$, $Sn^{2+}$ to $Sn^{4+}$), metal clusters (e g a Cu cluster or a Fe cluster), or salts comprising species that may be reduced (e g $Fe^{3+}$ to $Fe^{2+}$, $Sn^{4+}$ to $Sn^{2+}$); metal organic complexes like ferrocenes, phthalocyanines, metallo-porphyrines.

In electrochemical pixel devices of the invention, it is preferred that the electrochromic material in the electrochromic device comprises an electrochromic polymer. The support in some embodiments of the electrochemical pixel device of the present invention is preferably selected from the group consisting of polyethylene terephthalate; polyethylene naphthalene dicarboxylate; polyethylene; polypropylene; paper; coated paper, e g coated with resins, polyethylene, or polypropylene; paper laminates; paperboard; corrugated board; glass and polycarbonate. The support is also preferably reflective.

Embodiment of an Electrochemical Pixel Device

Figure 1:
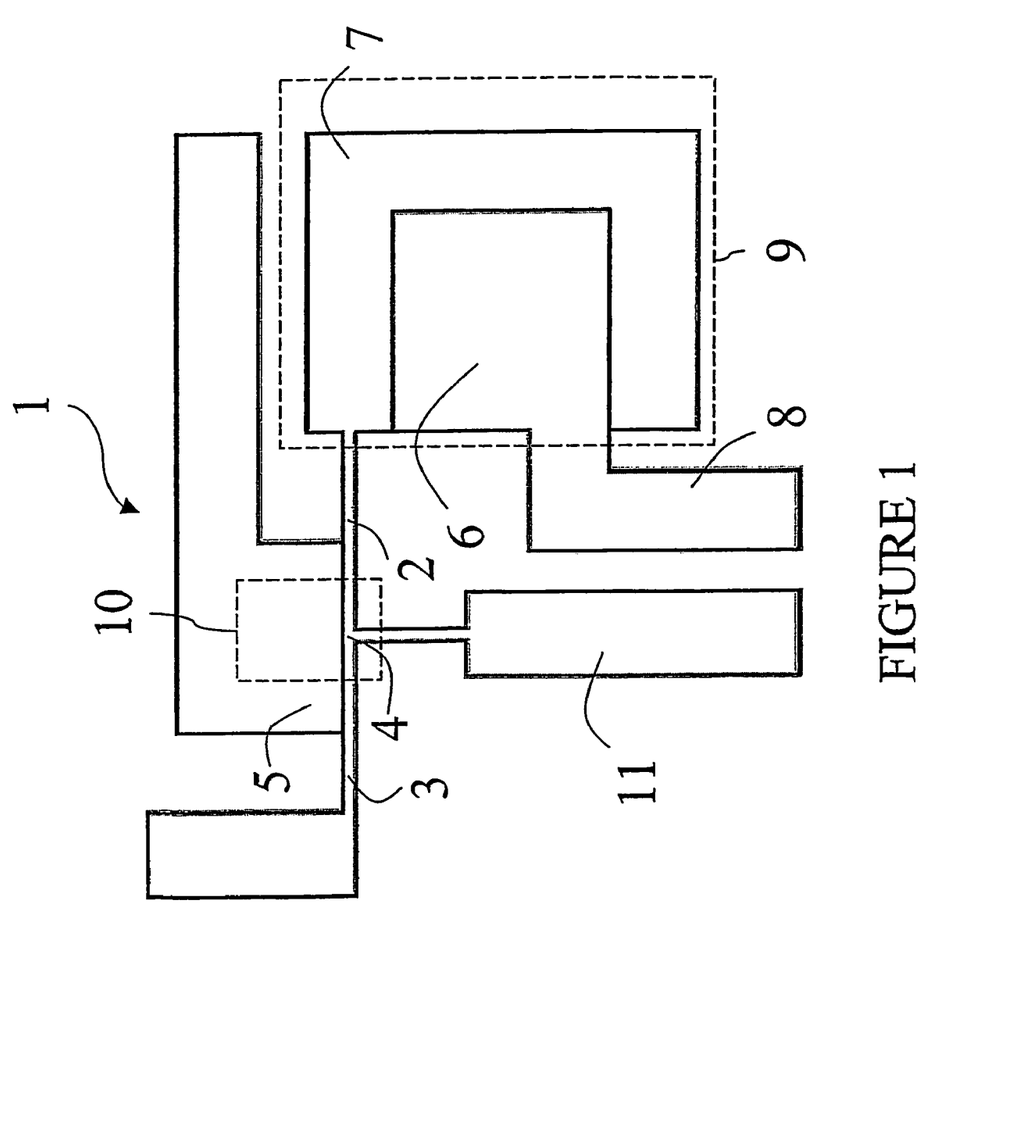
FIG. 1 shows a top view of elements of one embodiment of an electrochemical pixel device interconnected with a transistor device.

A typical electrochemical pixel device according to one exemplifying embodiment is shown schematically in FIG. 1. The electrochemical pixel device 1 is constructed through patterning of a suitable material (see above), and comprises an electrochemical transistor device (2-5, 10-11) and an electrochromic device (6-9). The electrochemical transistor device, which does not form part of the present invention, comprises a source contact 2 and a drain contact 3. Between, and in direct electrical contact with, the source and drain contacts is arranged an electrochemically active element 4, the conductivity of which may be altered through application of a gate voltage to a positive gate electrode 5. The electrochemically active element 4 and part of the positive gate electrode 5 are covered with a layer of solidified electrolyte 10. In this embodiment, the source and drain contacts 2,3 and the electrochemically active element 4 are all formed by a continuous piece of the material. This piece is separated by a narrow gap from the gate electrode 5, so that there is no direct electrical contact between the electrochemically active element 4 and the gate electrode 5.

The electrochromic device comprises an electrochromic element 6, as well as two electrodes 7, 8. Covering the electrochromic element 6 and the first electrode 7 is a layer of solidified electrolyte 9. There is no direct electrical contact between the first electrode 7 and the electrochromic element 6, but between the electrochromic element 6 and the second electrode 8. The first electrode 7 of the electrochromic device is in direct electrical contact with, or rather coincides with, the source contact 2 of the electrochemical transistor device.

Upon function of the electrochemical pixel device 1, a colouring or decolouring current is supplied to the electrochromic element 6 through application of a voltage between drain contact 3 and electrode 8, corresponding to a drain-source-voltage $V_{ds}$. The current actually supplied to the electrochemic element 6 is controlled by the conductivity in the electrochemically active element 4. This conductivity, in turn, is controlled by a gate voltage $V_g$ at the positive gate electrode 5. The gate voltage $V_g$ may, in certain embodiments, be applied between the positive gate electrode 5 and a second, negative gate electrode 11, which may or may not be in direct electrical contact with the electrochemically active element 4. Alternatively, the gate voltage is applied between the positive gate electrode 5 and either of the source contact 2 or the drain contact 3.

Figure 2:
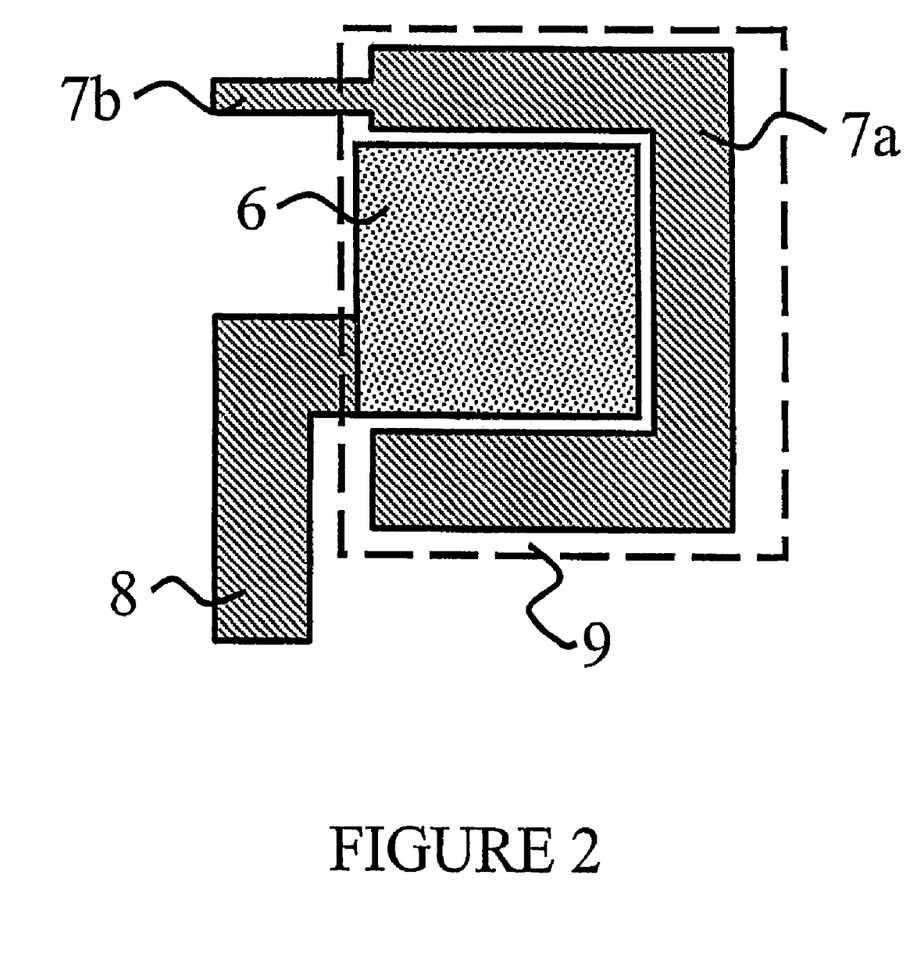
FIG. 2 shows a top view of a similar device as shown in FIG. 1 but having the transistor part omitted.

The above described embodiment of the electrochromic device is thus interconnected with a transistor, which is used for driving the device. The transistor does however not form part of the present invention, but only serves as an example of a possible application for the invention. Of course, in many applications the transistor can be left out. This is the case, for example, when the electrochromic device is to be passively addressed. Such a passive device of course can be formed similar to the above embodiment, only by omitting the transistor. An embodiment of such an electrochromical device is illustrated in FIG. 2, which in effect is an identical device as the one shown in FIG. 1, but having the transistor omitted.

In an experiment using the above embodiment of an electrochemical pixel device, the device was manufactured as follows: a starting material of Orgacon™ EL-350 foil, commercially available from Agfa and comprising the conducting and electrochromic polymer PEDOT-PSS (poly-(3, 4-ethylendioxythiophene) doped with poly(styrene sulfonate)) was used. Patterning of the PEDOT-PSS substrate was done using a plotter tool equipped with a scalpel. The electrolyte used was commercially available Blågel™ from Apoteksbolaget, Sweden. The gel was applied using silk-screen printing with a 45 μm thick, patterned vinyl foil as template. Alternatively, 10% hydroxy ethyl cellulose in water may be used as the electrolyte gel.

PEDOT-PSS is a material that exhibits a very light, pale blue colour and good conductivity in its native, partly oxidised state. When the PEDOT-PSS is reduced, its conductivity diminishes greatly, and the material is coloured deeply blue. In such PEDOT-PSS pixel devices as the one described with reference to FIG. 1, the electrochromic device is typically driven with $V_{ds}$ voltages between 1.5 and 2 V, and the display area varies between 1 and 2 cm². The electrochromic element 6 in this case is reduced and switched to a deep blue colour. An electrode 7 converts the electronic current to ionic current or vice versa is also present. In experiments with the PEDOT-PSS pixel, the current passing through the electrochromic device was about 200-300 μA in the beginning, at a $V_{ds}$ of 2 V and an electrochromic element area of 1-2 cm². After approximately 10 s it was fully switched and saturated. The current flowing through the electrochromic device in this saturated state was around 50 μA. The reason for this current even in the reduced, non-conducting state of PEDOT-PSS is leakage from the display cell.

In experiments switching the transistor, the electrochemical transistor device was driven by gate voltages between 0 and 1.5 V. At a gate voltage of 0 V, the electrochemically active element was fully conducting, and at 1.5 V, it was in its "off" state. Already at 0.3-0.4 V it was evident from the appearance of blue colouring that the transistor channel was being reduced, which corresponds to an increased resistance. The resistance in the transistor channel was approximately around 10 kΩ in its conducting state, which corresponded to a current of 200 μA at 2 V. In the cut-off state, at gate voltages of around 1.5 V, the resistance was greatly increased. Current values of around 200 nA were reached, corresponding to a resistance of 10 MΩ. The on/off-ratio for the electrochemical transistor device part of the electrochemical pixel device was thus 1000 in this case. Furthermore, extreme on/off-ratios of $10^5$ in the electrochemical transistor were reached with components made in alternative ways.

Some working characteristics of this electrochemical pixel device:

The transistor channel was conducting at a gate voltage, $V_g$, of 0 V, and substantially non-conducting at a $V_g$ of 1 V.

If already reduced, i e deep blue, the electrochromic element decoloured at a $V_{ds}$ of 0 V, otherwise nothing happened. At a $V_{ds}$ of 2 V, electrochemistry occurred, and the electrochromic element changed to its reduced, deep blue state, and remained in this state as long as the voltage was applied.

Effects of four possible combinations of voltages applied to the pixel:

$V_g$=0 V, $V_{ds}$=0 V; nothing happens, or the pixel decolours if it was reduced from the beginning.

$V_g$=0 V, $V_{ds}$=2 V; colours the pixel, which then remains in this state.

$V_g$=1 V, $V_{ds}$=0 V; the transistor channel is rendered non-conducting. If the pixel is already reduced, the increased impedance in the channel keeps the charges inside the pixel area.

$V_g$=1 V, $V_{ds}$=2 V; nothing happens.

Figure 3:
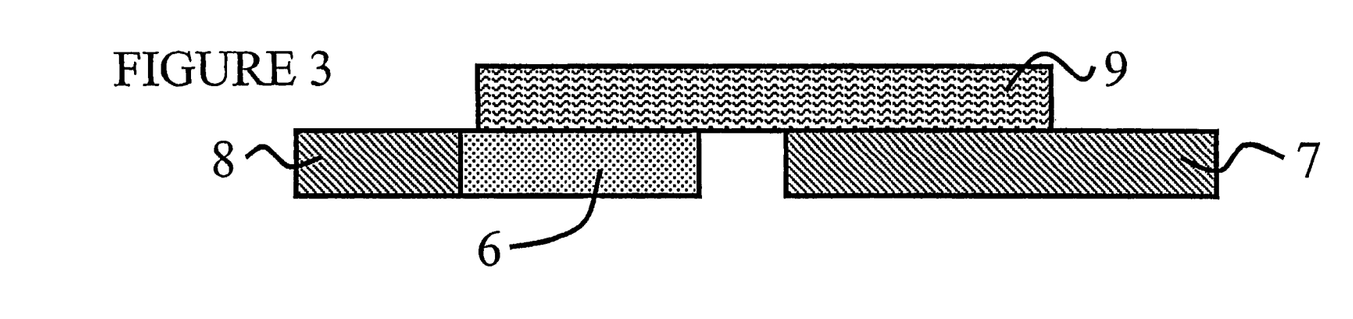
FIGS. 3, 4 and 5 show various embodiments of the electrochemically active element.

FIG. 3 illustrates a electrochemical device, in which the electrochemical element 6 and the electrodes 7 and 8 are all placed side by side, and the electrochromical element is place at a distance from electrode 7 and in direct electrical contact with electrode 8.

Figure 4:
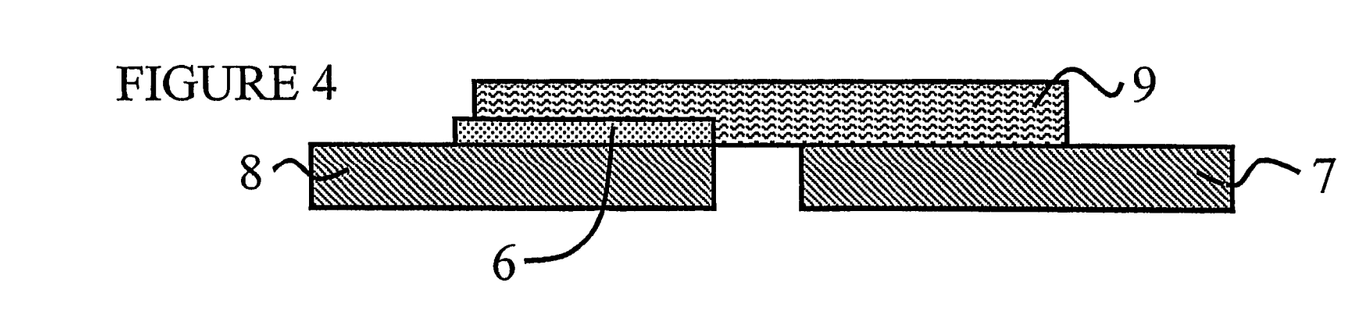
Figure 5:
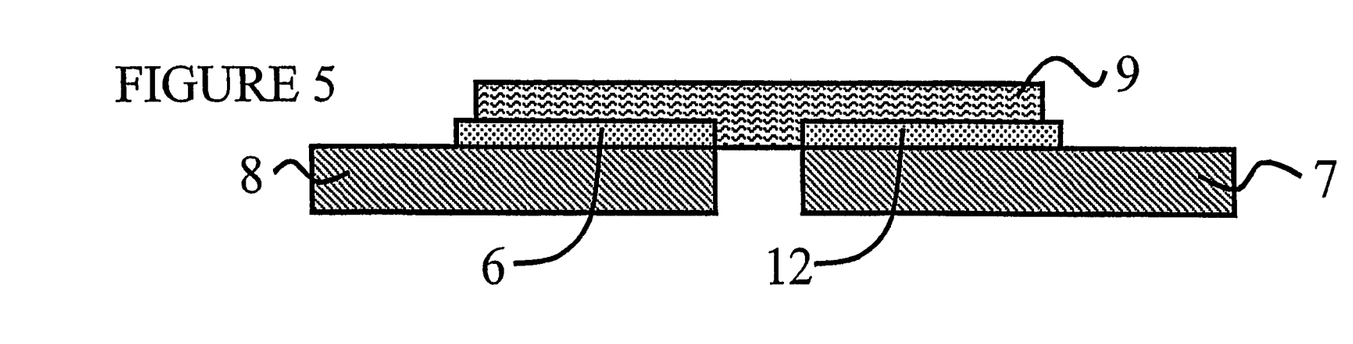

FIG. 4 illustrates an alternative arrangement, in which the electrochemically active element 6 is instead placed on top of the electrode 8. FIG. 5 illustrates a similar arrangement as the one illustrated in FIG. 4, but having an additional, protective layer 12 deposited on electrode 7. The protective layer 12 serves to protect the electrode 7 from being over-oxidised when exposed to an oxidative current.

Figure 6:
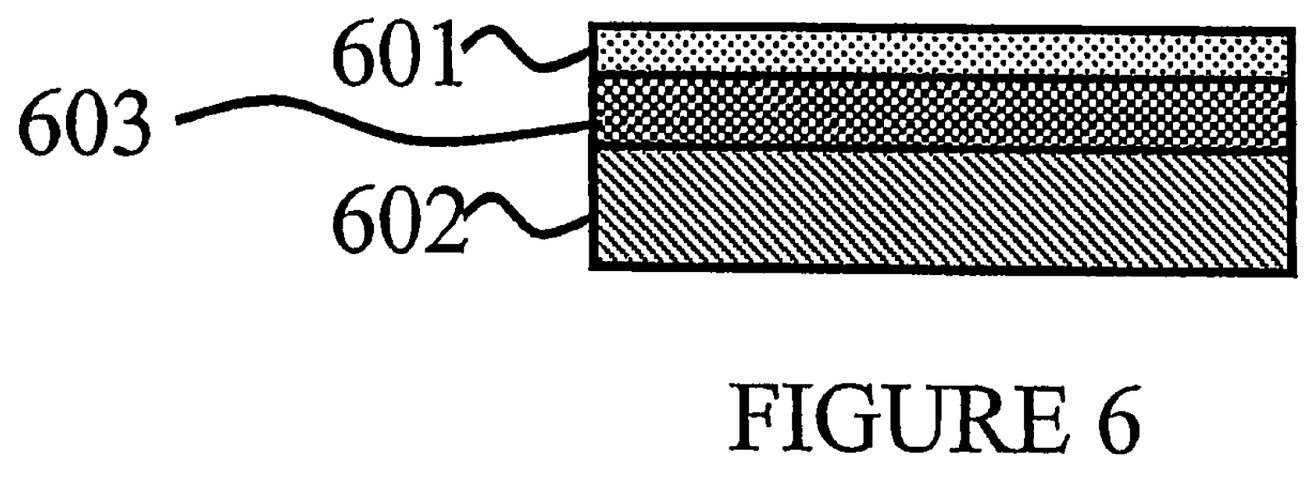
FIG. 6 shows a cross section of an electrochemically active element.

FIG. 6 illustrates an inventive electrochemical element, comprising mixture layer 602 of PEDOT-PSS mixed with polystyrene and a protective layer 601 comprising PANI. At the interface between layers 601 and 602 there is formed an intermediate layer 603, which is the result of solvents in the PANI solution dissolving and mixing with the surface of the PEDOT-PSS layer. The creation of such an intermediate layer is actually the reason explaining the improved adhesion of the PANI layer to the PEDOT-PSS layer. However, for other material combinations such a intermediate layer 603 might not be formed, the layers 601 and 602 instead being in direct contact with each other. The protective PANI layer serves to protect the mixture layer from being over-oxidised, and also provides the element with switchable redox properties.

Figure 7:
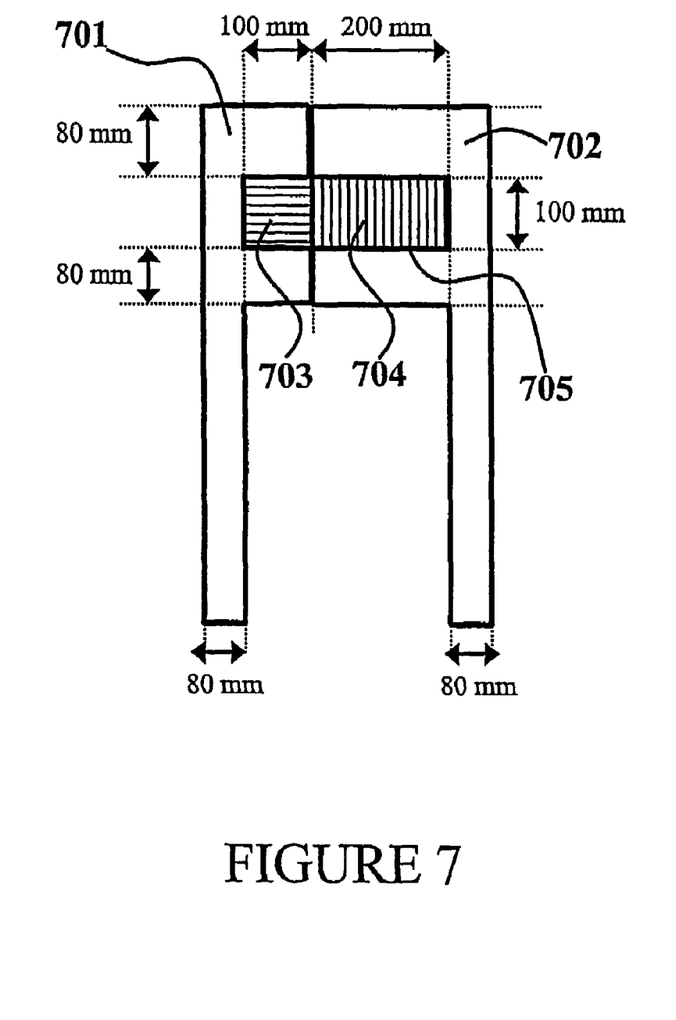
FIG. 7 shows a top view of an electrochromic device according to one embodiment.

In the following three examples, reference will be made to a test architecture which is shown in FIG. 7. The test architecture thus comprises a counter electrode 702 and a pixel electrode 701. On the pixel electrode, an electrochromic element 703 is defined, and on the counter electrode a counter electrode area 704 is defined. This counter electrode area 704 is actually also an electrochromic element in the following examples. On top of the electrochromic element and the counter electrode area a solidified electrolyte 705 is deposited. In all three examples, the electrolyte is based on water and contains 10% by weight of hydroxyethyl cellulose, 20% by weight of glycerol, 8% by weight of sodium citrate salt (Na-citrate). The pH value of the electrolyte is adjusted to between 4 and 5 by adding $H_3PO_4$ prior to applying the electrolyte onto the device.

Improved Lateral Electrochemical Display Cell

Thus, referring to FIG. 7, an electrochromic device having a lateral design is shown. The electrodes 701 and 702 were formed from an Orgacon™ EL-350 foil. In this case the PEDOT-PSS functions both as conductors and electrodes in the device. The counter electrode 702 was coated with PANIPOL T™ deposited by drop casting. An identical device is made up as reference from the same components but without the PANI layer.

The pixels were switched continuously in forward bias 1.5V where the electrochromical element turns transparent and in backward bias 9.0V where the pixel element turns blue. The cycling was continued for 1 000 cycles and the pixel and counter electrodes were checked for overoxidation. The PANI covered counter electrode was nearly unaffected (less than 1% degradation of the active area) but the counter electrode of the reference device was completely degraded after 1000 switches. The PANI coated device actually continued to switch for over 10 000 switches and its lifetime was limited not due to overoxidation but due to delamination of the PANI from the PEDOT-PSS layer. This delamination is believed to be the effect of, at least partially, the different swelling properties of the two materials, PEDOT-PSS and PANI, which caused mechanical strains during electrochemical switching.

Improved Adhesion in a Lateral Electrochemical Display Cell

The same device architecture as in the example above is utilized, with the exception that the PEDOT-PSS used in the counter electrode part of the device here was a screen printable paste, Orgacon EL™, as supplied by Agfa. On top of the screen-printed counter electrode part of the device was drop casted a PANIPOL T™ solution. An identical device, a reference, was made up from the same components but the screen-printed PEDOT-PSS layer was replaced by Orgacon EL350™. Tape tests performed by ripping of tapes adhered to the elements showed much improved adhesion of the PANI onto the screen-printed paste as compared to the Orgacon™ EL-350 foil.

The pixel was switched continuously in forward bias 1.5V where the pixel elements turn transparent and in backward bias 9.0V were the pixel elements turn blue. The cycling was continued for 10 000 cycles and the pixel and counter electrode were checked for overoxidation and delamination. No significant delamination or degradation of the counter electrode could be observed. The device was kept switching for over 25 000 switches and still no significant degradation of the counter electrode or delamination could be observed.

Improved Contrast Ratio in a Lateral Electrochemical Display Cell

The same architecture as in the above example was used. The electrodes were formed from Orgacon™ EL-350. On the counter electrode area and on the electrochromic element an additional PANIPOL T™ layer was deposited by drop casting. An identical device, a reference, was made up from the same components but the PANI layer on the pixel element was omitted. The pixels were switched continuously in forward bias 1.5V where the pixel element turns transparent and in backward bias 1.5V where the pixel element turns blue. The cycling was continued for 10 cycles when the pixel and counter electrodes were assumed to have reached "equilibrium conditions". The contrast was measured using a spectrometer. The wavelength used was 640 nm. The contrast ratios were compared, in a forward bias of 1.5 V were the PEDOT-PSS pixel turns transparent and the PANI coated PEDOT-PSS pixel becomes blue and in a backward bias of 1.5 V were the PEDOT-PSS pixel turns blue and the PANI coated PEDOT-PSS pixel becomes transparent. The different contrasts using the Lab vector length in the CIE-Lab colour coordinates were for the PEDOT-PSS pixel 4 and for the PANI coated PEDOT-PSS pixel it was 20.

The invention claimed is:

1. An electrochemically active element comprising:
   a first layer comprising PEDOT-PSS mixed with an adhesion promoter; and
   a second layer comprising PANI, the second layer being deposited on top of and in direct electrical contact with the first layer.

2. An electrochemically active element according to claim 1, wherein the adhesion promoter comprises polystyrene.

3. An electrochemically active element according to claim 1, wherein said PANI is cast from a toluene solution.

4. An electrochemically active element according to claim 1, wherein said adhesion promoter is selected from a group comprising: polystyrene, latex formulations, PMMA (poly (methylemetaacrylate)), polyurethanes, polyglycol esters, N-vinyl lactams, gelatine, a gelatine derivative, polyacrylic acids or esters, polymethacrylic acid, poly(vinylpyrrolidone), polysaccharides, cellulose derivatives, hydroxyethylcellulose, polyacrylamides, polyurethanes, polypropylene oxides, polyethylene oxides, poly(styrene sulphonic acid), poly(styrene sulphonic esters), poly(vinyl alcohol esters) and poly(vinyl alcohol) and derivatives, salts, blends and copolymers thereof.

5. An electrochemically active element according to claim 1, wherein said second layer is deposited on top of said first layer.

6. An electrochemically active device comprising:
   a first layer comprising PEDOT-PSS mixed with an adhesion promoter; and
   a second layer comprising PANI, which is in direct electrical contact with said first layer, and a solidified electrolyte which is in direct electrical contact with one of said layers.

7. An electrochemical device according to claim 6, wherein said solidified electrolyte is in direct electrical contact with said second layer.

8. An electrochemical device according to claim 6, wherein said second layer is deposited on top of said first layer.

9. An electrochromic pixel comprising a solidified electrolyte in direct electrical contact with a first electrochemically active pixel element having:
   a first layer comprising PEDOT-PSS mixed with an adhesion promoter; and
   a second layer comprising PANI, which is in direct electrical contact with said first layer.

10. An electrochromic pixel according to claim 9, further comprising a second electrochemically active pixel element comprising PEDOT-PSS, wherein only said first electrochemically active pixel element comprises a layer of PANI.

11. An electrochromic pixel according to claim 10, wherein said pixel device is a lateral pixel device.

12. An electrochromic pixel according to claim 10, wherein said pixel device is a vertical pixel device.

13. An electrochemical transistor comprising a solidified electrolyte in direct electrical contact with a electrochemically active element having:
- a first layer comprising PEDOT-PSS mixed with an adhesion promoter; and
- a second layer comprising PANI, which is in direct electrical contact with said first layer.

14. A diode device comprising a solidified electrolyte in direct electrical contact with a electrochemically active element having:
- a first layer comprising PEDOT-PSS mixed with an adhesion promoter; and a second layer comprising PANI, which is in being in direct electrical contact with said first layer.

15. A method of producing an electrochemically active device comprising the steps of:
- printing a first and a second electrode on a substrate, which electrodes comprises PEDOT-PSS mixed with an adhesion promoter;
- printing a layer of PANI on top of said first electrode; and
- applying a layer of electrolyte in contact with at least a part of said PANI layer and in contact with at least a part of said second electrode.

* * * * *

UNITED STATES PATENT AND TRADEMARK OFFICE
CERTIFICATE OF CORRECTION

PATENT NO. : 7,301,687 B2  Page 1 of 1
APPLICATION NO. : 11/633548
DATED : November 27, 2007
INVENTOR(S) : Magnus Berggren et al.

It is certified that error appears in the above-identified patent and that said Letters Patent is hereby corrected as shown below:

On the title page, item (62) of the Patent, please add the following claim for priority:

U.S. Patent Application No. 10/091,397, filed March 7, 2002, now U.S. Patent No. 6,642,069, granted November 4, 2003, and International Application No. PCT/SE02/00404, filed March 7, 2002.

Signed and Sealed this

Fifteenth Day of April, 2008

JON W. DUDAS
*Director of the United States Patent and Trademark Office*